US011156277B2

(12) United States Patent
Nishikawa

(10) Patent No.: US 11,156,277 B2
(45) Date of Patent: Oct. 26, 2021

(54) TORQUE FLUCTUATION INHIBITING DEVICE, TORQUE CONVERTER AND POWER TRANSMISSION DEVICE

(71) Applicant: EXEDY Corporation, Neyagawa (JP)

(72) Inventor: Tomoyuki Nishikawa, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 275 days.

(21) Appl. No.: 16/473,618

(22) PCT Filed: Jan. 15, 2018

(86) PCT No.: PCT/JP2018/000754
§ 371 (c)(1),
(2) Date: Jun. 25, 2019

(87) PCT Pub. No.: WO2018/150777
PCT Pub. Date: Aug. 23, 2018

(65) Prior Publication Data
US 2019/0323576 A1    Oct. 24, 2019

(30) Foreign Application Priority Data

Feb. 17, 2017    (JP) .............................. JP2017-027688

(51) Int. Cl.
*F16H 45/02*    (2006.01)
*F16F 15/134*    (2006.01)
(Continued)

(52) U.S. Cl.
CPC ........... *F16H 45/02* (2013.01); *F16F 15/134* (2013.01); *F16F 15/14* (2013.01); *F16H 25/18* (2013.01);
(Continued)

(58) Field of Classification Search
CPC ...... F16F 15/1202; F16F 15/14; F16F 15/145; F16F 15/31; F16F 2230/0064;
(Continued)

(56) References Cited

U.S. PATENT DOCUMENTS

| 4,947,706 A | 8/1990 | Umemiya et al. |
| 2015/0075320 A1* | 3/2015 | Verhoog ................. F16F 15/31 |
| | | 74/574.2 |

(Continued)

FOREIGN PATENT DOCUMENTS

| CN | 105378334 A | 3/2016 |
| DE | 102014116855 A1 | 6/2015 |

(Continued)

OTHER PUBLICATIONS

1st Office Action of the corresponding Chinese Application No. 201880012220.2, dated Sep. 29, 2020, 7 pp.
(Continued)

*Primary Examiner* — Richard M Lorence
(74) *Attorney, Agent, or Firm* — United IP Counselors, LLC

(57) ABSTRACT

The present device includes an inertia ring, a plurality of centrifugal elements, a plurality of cam mechanisms and a plurality of restriction mechanisms. The inertia ring is disposed to be rotatable with a hub flange and be rotatable relatively to the hub flange. Each centrifugal element is disposed to receive a centrifugal force generated by rotation of the hub flange and the inertia ring. When a relative displacement is produced between the hub flange and the inertia ring in a rotational direction while the centrifugal force is acting on each centrifugal element, each cam mechanism converts the centrifugal force into a circumferential force directed to reduce the relative displacement. Each restriction mechanism allows actuation of each centrifugal element by each cam mechanism, and restricts radial movement of each centrifugal element.

8 Claims, 12 Drawing Sheets

(51) Int. Cl.
*F16F 15/14* (2006.01)
*F16H 25/18* (2006.01)

(52) U.S. Cl.
CPC ............... *F16H 2045/0221* (2013.01); *F16H 2045/0263* (2013.01)

(58) Field of Classification Search
CPC ............ F16H 45/02; F16H 2045/0221; F16H 2045/0226; F16H 2045/0231; F16H 2045/0263; Y10T 74/2128
See application file for complete search history.

(56) References Cited

U.S. PATENT DOCUMENTS

| | | | | |
|---|---|---|---|---|
| 2015/0152940 A1* | 6/2015 | Krause | ............... | F16F 15/31 74/574.2 |
| 2016/0160959 A1 | 6/2016 | Takikawa et al. | | |
| 2021/0131525 A1* | 5/2021 | Higuchi | ............... | F16H 45/02 |

FOREIGN PATENT DOCUMENTS

| | | |
|---|---|---|
| EP | 259173 A2 | 3/1888 |
| JP | 63-132144 U | 8/1988 |
| JP | 06-02048 Y2 | 1/1994 |
| JP | 2010-071341 A | 4/2010 |
| JP | 2012-062962 A | 3/2012 |
| JP | 2014-020467 A | 2/2014 |
| JP | 2014-145413 A | 8/2014 |
| JP | 5571513 B2 | 8/2014 |
| JP | 2015-057565 A | 3/2015 |
| JP | 2015-083847 A | 4/2015 |
| JP | 2015-094424 A | 5/2015 |
| WO | 2015/020086 A1 | 2/2015 |

OTHER PUBLICATIONS

International Search Report dated Feb. 6, 2018 for corresponding International Application No. PCT/JP2018/000754, pp. 2.

* cited by examiner

TORQUE FLUCTUATION INHIBITING DEVICE, TORQUE CONVERTER AND POWER TRANSMISSION DEVICE

CROSS-REFERENCE TO RELATED APPLICATIONS

This application is the National Phase in the United States of PCT/JP2018/000754, filed Jan. 15, 2018, which claims priority to Japanese Patent Application No. 2017-027688, filed Feb. 17, 2017. Both of those applications are incorporated by reference in their entireties.

TECHNICAL FIELD

The present invention relates to a torque fluctuation inhibiting device, particularly to a torque fluctuation inhibiting device for inhibiting torque fluctuations in a rotor, to which a torque is inputted, and that is rotated about a rotational axis. Additionally, the present invention relates to a torque converter and a power transmission device, each of which includes the torque fluctuation inhibiting device.

BACKGROUND ART

For example, a clutch device, including a damper device, and a torque converter are provided between an engine and a transmission in an automobile. Additionally, for reduction in fuel consumption, the torque converter is provided with a lock-up device for mechanically transmitting a torque at a predetermined rotational speed or greater.

In general, the lock-up device includes a clutch part and a damper including a plurality of torsion springs. Additionally, the clutch part includes a piston to which a friction member is attached and that is pressed onto a front cover by an action of hydraulic pressure. Then in a lock-up on state, a torque is transmitted from the front cover to the piston through the friction member, and is further transmitted therefrom to an output-side member through the plural torsion springs.

In the lock-up device described above, torque fluctuations (fluctuations in rotational velocity) are inhibited by the damper including the plural torsion springs.

Incidentally, a lock-up device described in Japan Laid-open Patent Application Publication No. 2015-094424 is provided with a dynamic damper device including an inertia member in order to inhibit torque fluctuations. The dynamic damper device described in Japan Laid-open Patent Application Publication No. 2015-094424 is attached to a plate supporting torsion springs, and includes a pair of inertia rings, which is rotatable relatively to the plate, and a plurality of coil springs disposed between the plate and the inertia rings.

BRIEF SUMMARY

A peak of torque fluctuations, appearing in a predetermined rotational speed range, can be reduced by well-known dynamic damper devices including the one described in Japan Laid-open Patent Application Publication No. 2015-094424. However, when an engine specification or so forth is changed, the rotational speed range in which the peak of torque fluctuations appears varies in accordance therewith. Therefore, the inertia amount of the inertia rings and the spring constant of the coil springs are required to be changed in accordance with the change of the engine specification or so forth. However, coping with the change may be difficult in some cases.

It is an object of the present invention to make it possible, in a device for inhibiting torque fluctuations in a rotary member, to reduce a peak of torque fluctuations in a relatively wide rotational speed range.

(1) A torque fluctuation inhibiting device according to the present invention is a device that inhibits torque fluctuations in a rotor to which a torque is inputted. The torque fluctuation inhibiting device includes a mass body, a plurality of centrifugal elements, a plurality of cam mechanisms and a plurality of restriction mechanisms. The mass body is disposed to be rotatable with the rotor and be rotatable relatively to the rotor. Each of the plurality of centrifugal elements is disposed to receive a centrifugal force generated in rotation of the rotor and the mass body. When a relative displacement is produced between the rotor and the mass body in a rotational direction while the centrifugal force is acting on the each of the plurality of centrifugal elements, each of the plurality of cam mechanisms converts the centrifugal force into a circumferential force directed to reduce the relative displacement. Each of the plurality of restriction mechanisms allows actuation of the each of the plurality of centrifugal elements by the each of the plurality of cam mechanisms, and restricts radial movement of the each of the plurality of centrifugal elements.

When a torque is inputted to the rotor in this device, the rotor and the mass body are rotated. When the torque inputted to the rotor does not fluctuate, any relative displacement is not produced between the rotor and the mass body in the rotational direction. Therefore, the rotor and the mass body are rotated in synchronization with each other. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, each centrifugal element receives a centrifugal force. Then, when the relative displacement is produced between the rotor and the mass body, each cam mechanism converts the centrifugal force acting on each centrifugal element into a circumferential force, and the circumferential force acts to reduce the relative displacement between the rotor and the mass body. Torque fluctuations are inhibited by the herein described actuation of each cam mechanism.

The centrifugal force acting on each centrifugal element is herein used as a force for inhibiting torque fluctuations. Hence, a characteristic of inhibiting torque fluctuations varies in accordance with the rotational speed of the rotor. Additionally, the characteristic of inhibiting torque fluctuations can be appropriately set by, for instance, the cam shape or so forth. Hence, a peak of torque fluctuations can be reduced in as wide a rotational speed range as possible.

Moreover, each restriction mechanism allows actuation of each centrifugal element by each cam mechanism, but restricts radial movement of each centrifugal element. Therefore, it is possible to avoid a situation that each centrifugal element is radially moved and collides with another member such as the rotor whereby hitting sound is produced. Contrarily, even when each centrifugal element collides with another member, hitting sound in collision can be reduced.

(2) Preferably, the each of the plurality of restriction mechanisms includes a restriction shaft and a restriction groove. The restriction shaft extends along a rotational axis of the rotor, and is provided in one of the mass body and the each of the plurality of centrifugal elements. The restriction groove, into which the restriction shaft is inserted, is provided in the other of the mass body and the each of the plurality of centrifugal elements.

Here, the restriction shaft is provided in, for instance, each centrifugal element and is inserted into the restriction groove provided in, for instance, the mass body. Because of this, in actuation of each centrifugal element, the restriction shaft is moved while being restricted by the restriction groove. As a result, radial movement of each centrifugal element is restricted.

Because of this, each restriction mechanism can be realized with a simple configuration. Additionally, the restriction shaft is inserted into the restriction groove. Hence, each centrifugal element can be restricted from moving radially outward and inward.

(3) Preferably, each of a plurality of other restriction mechanisms includes a restriction shaft and a restriction surface. The restriction shaft extends along a rotational axis of the rotor, and is provided in the mass body. The restriction surface, against which the restriction shaft slides, is provided on an inner peripheral surface of the each of the plurality of centrifugal elements.

Each centrifugal element is herein actuated while making contact, at the restriction surface provided on the inner peripheral surface thereof, with the restriction shaft provided in the mass body. Because of this, each centrifugal element can be restricted from moving radially inward. Additionally, it is not required to form a groove for guiding the restriction shaft, whereby each restriction mechanism is further simplified in configuration.

(4) Preferably, the torque fluctuation inhibiting device further includes an elastic body provided on either an outer peripheral surface of the restriction shaft or a surface with which the restriction shaft makes contact.

In this case, collision is alleviated between the restriction shaft and the part with which the restriction shaft collides, and hitting sound in collision can be further reduced.

(5) Preferably, the rotor includes a plurality of recesses on an outer peripheral surface thereof, and the each of the plurality of centrifugal elements is accommodated in each of the plurality of recesses of the rotor. Additionally, the each of the plurality of restriction mechanisms restricts an inner peripheral surface of the each of the plurality of centrifugal elements from making contact with a bottom surface of the each of the plurality of recesses.

In rotation of the rotor and the mass body, each centrifugal element is herein going to move radially outward by the centrifugal force acting thereon. On the other hand, when rotation of the rotor and the mass body is stopped, the centrifugal force no longer acts on each centrifugal element. Therefore, when the restriction mechanisms are not provided, one of the centrifugal elements, located in an upper position, drops downward and collides with the bottom surface of the corresponding one of the recesses. Hitting sound is supposed to be produced in this collision.

However, the restriction mechanisms herein restrict the centrifugal elements from moving radially inward, whereby each centrifugal element is prevented from colliding with the bottom surface of each recess of the rotor. Therefore, production of hitting sound can be eliminated between each centrifugal element and the bottom surface of each recess in stop of rotation.

(6) Preferably, the each of the plurality of cam mechanisms includes a cam and a cam follower. The cam is provided on one of the mass body and the each of the plurality of centrifugal elements. The cam follower is provided on the other of the mass body and the each of the plurality of centrifugal elements, and is moved along the cam.

Here, the amount of the relative displacement between the rotor and the mass body in the rotational direction fluctuates in accordance with the magnitude of torque fluctuations in the rotor. At this time, torque fluctuations can be inhibited as efficiently as possible by setting the shape of the cam such that the circumferential force, into which the centrifugal force is converted, varies in accordance with the amount of the relative displacement.

(7) Preferably, the mass body includes a first inertia ring, a second inertia ring and a pin. The first and second inertia rings are disposed in opposition to each other through the rotor. The pin couples the first and second inertia rings to each other so as to make the first and second inertia rings non-rotatable relatively to each other. The each of the plurality of centrifugal elements is disposed on an outer peripheral part of the rotor and on an inner peripheral side of the pin, while being disposed between the first inertia ring and the second inertia ring in an axial direction. The cam follower is a cylindrical roller including a hole that an interior thereof is penetrated by the pin in the axial direction. The cam is provided on the each of the plurality of centrifugal elements so as to make contact with the cam follower, and has a shape making the circumferential force vary in accordance with an amount of the relative displacement between the rotor and the mass body in the rotational direction.

Attachment of the cam follower is herein done by utilizing the pin coupling the first inertia ring and the second inertia ring. Therefore, the cam mechanism is simplified in configuration.

(8) A torque converter according to the present invention is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(9) A power transmission device according to the present invention includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

Advantageous Effects of Invention

According to the present invention described above, in a device for inhibiting torque fluctuations in a rotary member, a peak of torque fluctuations can be reduced in a relatively wide rotational speed range. Besides, according to the present invention, production of hitting sound can be inhibited in collision of a centrifugal element against another member.

DETAILED DESCRIPTION

First Exemplary Embodiment

Figure 1:
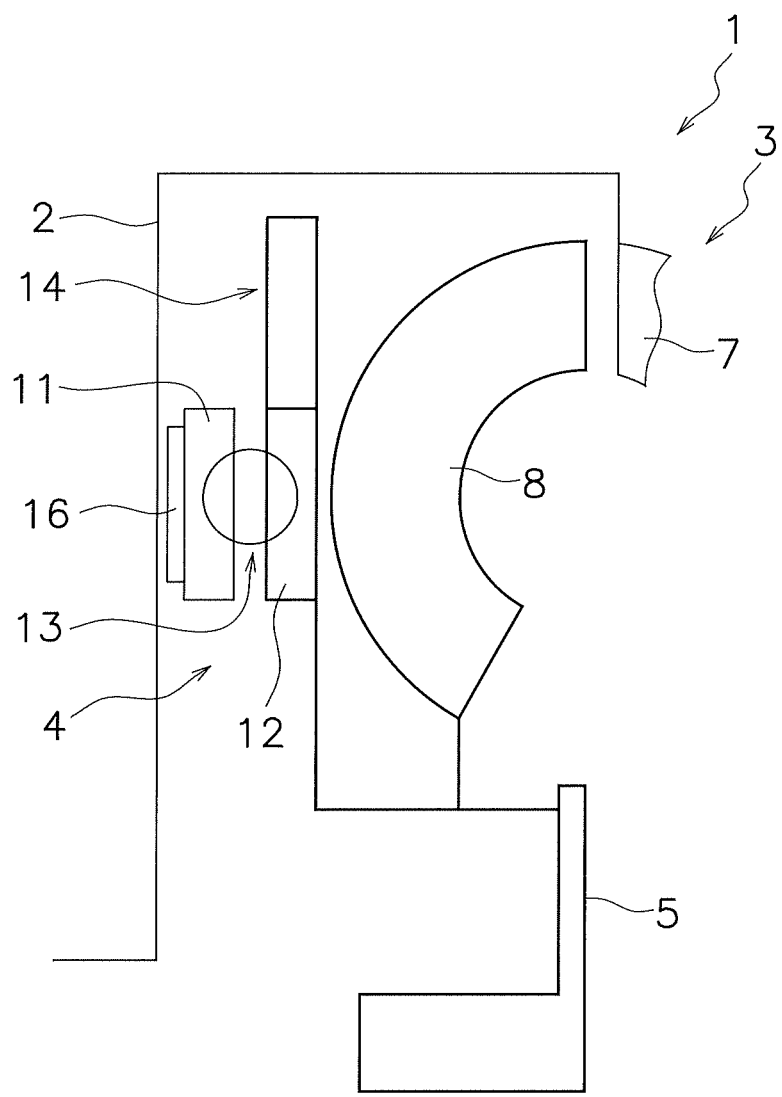
FIG. 1 is a schematic diagram of a torque converter according to a first exemplary embodiment of the present invention.

FIG. 1 is a schematic diagram of a condition that a torque fluctuation inhibiting device according to a first exemplary embodiment of the present invention is attached to a lock-up device for a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5. An input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, a hub flange 12 (rotor), a damper 13 and a torque fluctuation inhibiting device 14.

The input-side rotor 11 includes an axially movable piston, and is provided with a friction member 16 fixed to the front cover 2-side lateral surface thereof. When the friction member 16 is pressed onto the front cover 2, the torque is transmitted from the front cover 2 to the input-side rotor 11.

The hub flange 12 is disposed in axial opposition to the input-side rotor 11, and is rotatable relatively to the input-side rotor 11. The hub flange 12 is coupled to the output hub 5.

The damper 13 is disposed between the input-side rotor 11 and the hub flange 12. The damper 13 includes a plurality of torsion springs, and elastically couples the input-side rotor 11 and the hub flange 12 in a rotational direction. The damper 13 transmits the torque from the input-side rotor 11 to the hub flange 12, and also, absorbs and attenuates torque fluctuations.

[Torque Fluctuation Inhibiting Device 14]

Figure 2:
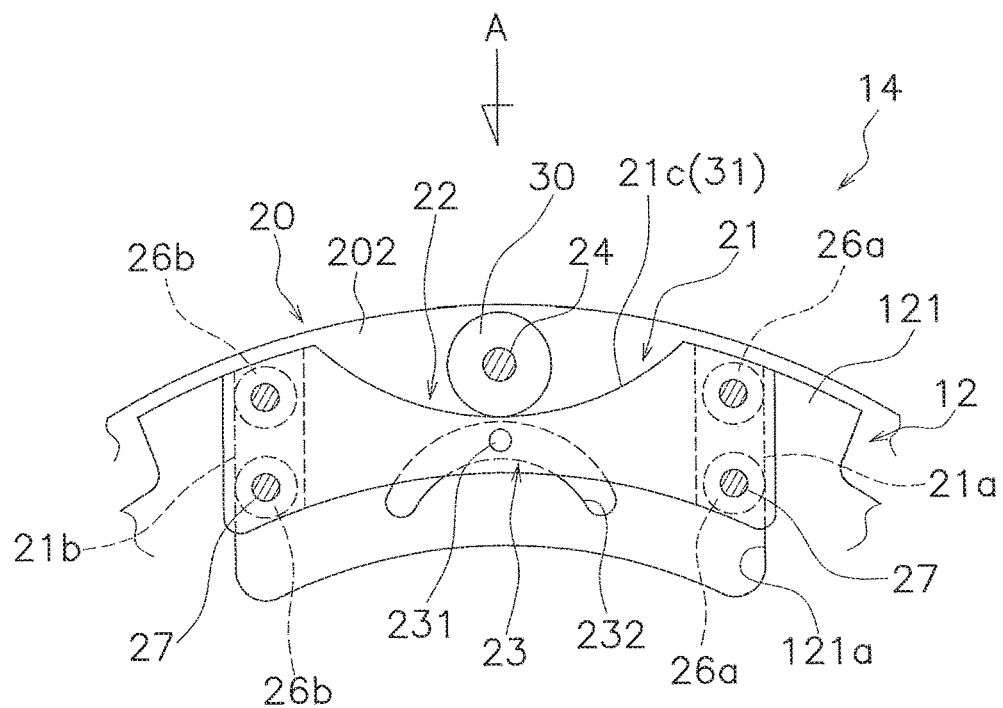
FIG. 2 is a partial front view of a hub flange and a torque fluctuation inhibiting device that are shown in FIG. 1.
Figure 3:
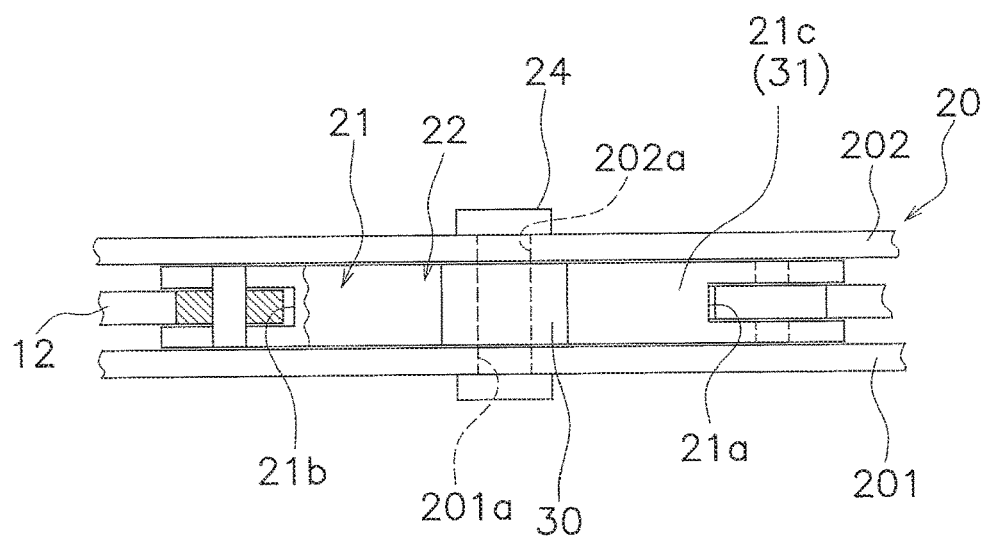
FIG. 3 is a view of FIG. 2 as seen from arrow A.
Figure 4:
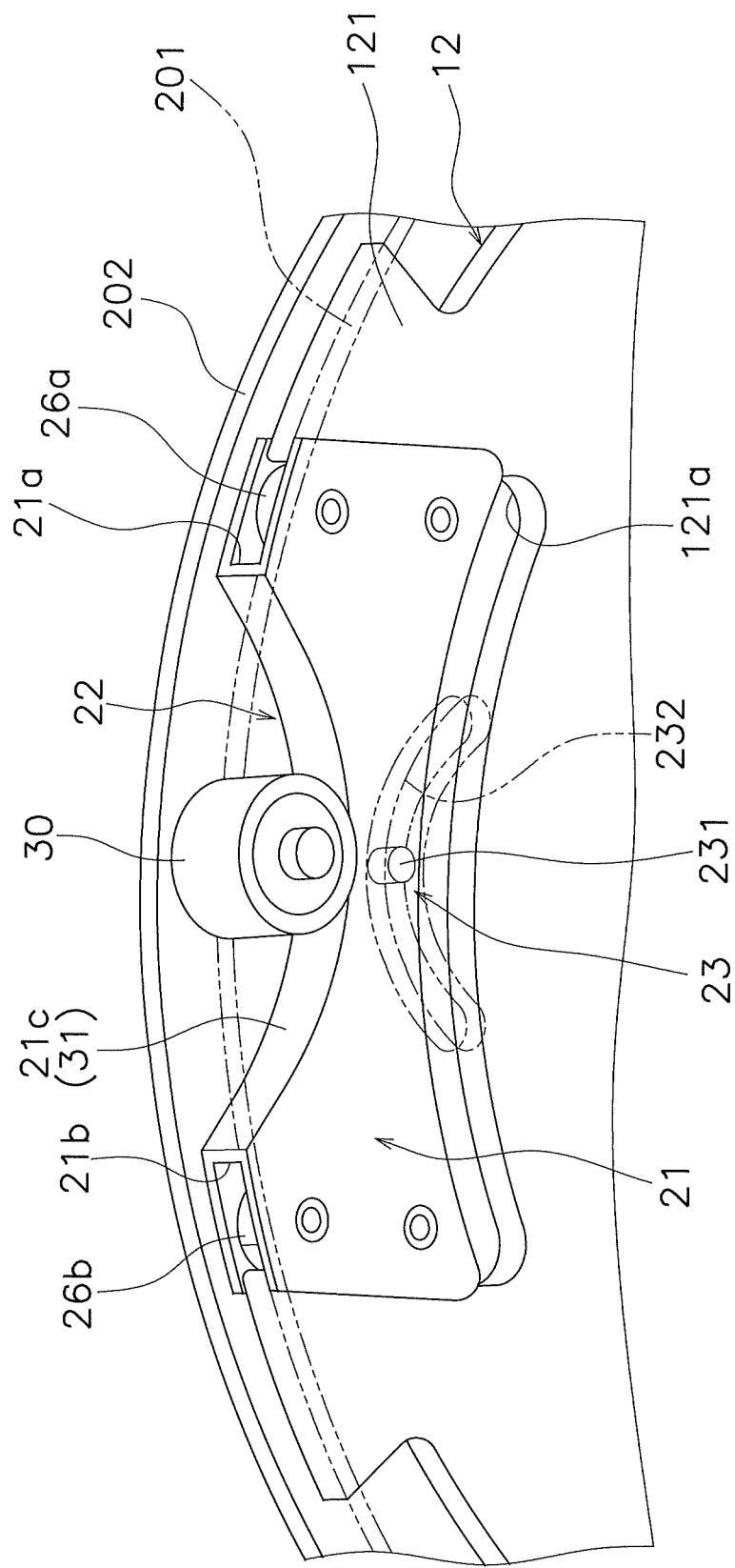
FIG. 4 is a perspective view of the appearance of the part shown in FIG. 2.

FIG. 2 is a front view of the hub flange 12 and the torque fluctuation inhibiting device 14. It should be noted that FIG. 2 shows a condition that one of inertia rings (near-side inertia ring) is detached. FIG. 3 is a view of FIG. 2 as seen from direction A, whereas FIG. 4 is an external perspective view of FIG. 2. Drawings of FIG. 2 and thereafter show part of the hub flange 12 and the torque fluctuation inhibiting device 14. As a whole, the part shown in the respective drawings is disposed in each of four positions aligned at equal angular intervals in a circumferential direction.

The torque fluctuation inhibiting device 14 includes first and second inertia rings 201 and 202, which compose a mass body 20, four centrifugal elements 21, four cam mechanisms 22 and four restriction mechanisms 23.

<First and Second Inertia Rings 201 and 202>

Each of the first and second inertia rings 201 and 202 is a continuous annular plate having a predetermined thickness. As shown in FIG. 3, the first and second inertia rings 201 and 202 are disposed axially on the both sides of the hub flange 12 such that a predetermined gap is produced between the hub flange 12 and each inertia ring 201, 202. In other words, the hub flange 12 and the first and second inertia rings 201 and 202 are disposed in axial alignment. The first and second inertia rings 201 and 202 have a common rotational axis that is the same as the rotational axis of the hub flange 12. The first and second inertia rings 201 and 202 are rotatable with the hub flange 12, and are also rotatable relatively to the hub flange 12.

Each of the first and second inertia rings 201 and 202 includes holes 201a, 202a, each of which axially penetrates therethrough. Additionally, the first and second inertia rings 201 and 202 are fixed by rivets 24 that penetrate the holes 201a and 202a thereof. Therefore, the first inertia ring 201 is axially, radially and rotation-directionally immovable with respect to the second inertia ring 202.

<Hub Flange 12>

The hub flange 12 has a disc shape, and as described above, is coupled at the inner peripheral part thereof to the output hub 5. The hub flange 12 is provided with four protruding portions 121 on the outer peripheral part thereof. Each protruding portion 121 protrudes from the outer peripheral part to the further outer peripheral side, and has a predetermined width in the circumferential direction. Each protruding portion 121 is provided with a recess 121a having a predetermined width in the circumferentially middle part thereof. Each recess 121a is shaped to be opened to the outer peripheral side, and has a predetermined depth.

<Centrifugal Elements 21>

The centrifugal elements 21 are disposed in the recesses 121a of the hub flange 12, respectively, and are radially movable by centrifugal forces to be generated by rotation of the hub flange 12. Each centrifugal element 21 has a circumferentially extending shape and includes grooves 21a and 21b on the both circumferential ends thereof. Each groove 21a, 21b has a larger thickness than the hub flange 12, and the hub flange 12 is inserted into part of each groove 21a, 21b.

It should be noted that an outer peripheral surface 21c of each centrifugal element 21 dents in a circular-arc shape to the inner peripheral side, and as described below, functions as a cam 31.

Two rollers 26a and two rollers 26b are disposed in the grooves 21a and 21b provided on the both ends of each centrifugal element 21, respectively. The respective rollers 26a and 26b are rotatably attached about pins 27 provided to penetrate the grooves 21a and 21b in a rotational axis direction. Additionally, the respective rollers 26a and 26b are capable of rolling along and in contact with the lateral surfaces of each recess 121a.

<Cam Mechanisms 22>

Each cam mechanism 22 is composed of a roller 30 and the cam 31. The roller 30 is provided as a cam follower and has a cylindrical shape. The cam 31 corresponds to the outer peripheral surface 21c of each centrifugal element 21. The roller 30 is fitted to the outer periphery of the trunk of each rivet 24. In other words, the roller 30 is supported by each rivet 24. It should be noted that preferably, the roller 30 is rotatably attached to each rivet 24, but alternatively, may be non-rotatably attached thereto. The cam 31 is a circular-arc surface with which the roller 30 makes contact. The roller 30 is moved along the cam 31 when the hub flange 12 and the first and second inertia rings 201 and 202 are rotated relatively to each other in a predetermined angular range.

Although described below in detail, when rotational phase difference is produced between the hub flange 12 and the first and second inertia rings 201 and 202 by the contact between the roller 30 and the cam 31, a centrifugal force generated in each centrifugal element 21 is converted into a circumferential force by which the rotational phase difference is reduced.

<Restriction Mechanisms 23>

The restriction mechanisms 23 allow actuation of the centrifugal elements 21 by the cam mechanisms 22, and restrict radial movement of the centrifugal elements 21. Each restriction mechanism 23 includes a pin 231 (restriction shaft) and a pair of grooves 232 (restriction grooves).

The pin 231 is provided to penetrate each centrifugal element 21 in the rotational axis direction. In more detail, the pin 231 is provided to extend along the rotational axis in a lengthwise (circumferential) middle part of each centrifugal element 21. On the other hand, the pair of grooves 232, having the same shape, is provided in corresponding positions on the first and second inertia rings 201 and 202. The pair of grooves 232, into which the pin 231 is inserted, is each made in the shape of a circular arc protruding to the outer peripheral side. A predetermined gap is produced between the pin 231 and each of the pair of grooves 232, whereby the pin 231 is smoothly movable within the pair of grooves 232.

Incidentally, when the hub flange 12 and the first and second inertia rings 201 and 202 are being rotated in synchronization with each other (i.e., when no rotational phase difference is produced between the hub flange 12 and the both inertia rings 201 and 202), the pin 231 is located in the lengthwise (circumferential) middle of the pair of grooves 232 as shown in FIG. 2. When the rotational phase difference is then produced between the hub flange 12 and the both inertia rings 201 and 202, each centrifugal element 21 is radially moved by the actuation of each cam mechanism 22. With this actuation of each centrifugal element 21, the pin 231 is moved along the pair of grooves 232. However, the shape of the pair of grooves 232 is set to prevent the inner peripheral surface of each centrifugal element 21 from making contact with the bottom surface of each recess 121a of the hub flange 12 regardless of where the pin 231 is located within the pair of grooves 232.

[Actuation of Cam Mechanisms 22]

Actuation of each cam mechanism 22 (inhibition of torque fluctuations) will be explained with FIGS. 2, 5 and 6. It should be noted that in the following explanation, the pair of first and second inertia rings 201 and 202 will be simply referred to as "an inertia ring 20" on an as-needed basis.

In the lock-up on state, a torque transmitted to the front cover 2 is transmitted to the hub flange 12 through the input-side rotor 11 and the damper 13.

When torque fluctuations do not exist in torque transmission, the hub flange 12 and the inertia ring 20 are rotated in the condition shown in FIG. 2. In this condition, the roller 30 in each cam mechanism 22 is contacted to the most inner peripheral position (circumferential middle position) of the cam 31, and the rotational phase difference between the hub flange 12 and the inertia ring 20 is "0".

As described above, the rotation-directional relative displacement between the hub flange 12 and the inertia ring 20 is referred to as "rotational phase difference". In FIGS. 2, 5 and 6, these terms indicate displacement between the circumferential middle position of each centrifugal element 21 and each cam 31 and the center position of each roller 30.

Figure 5:
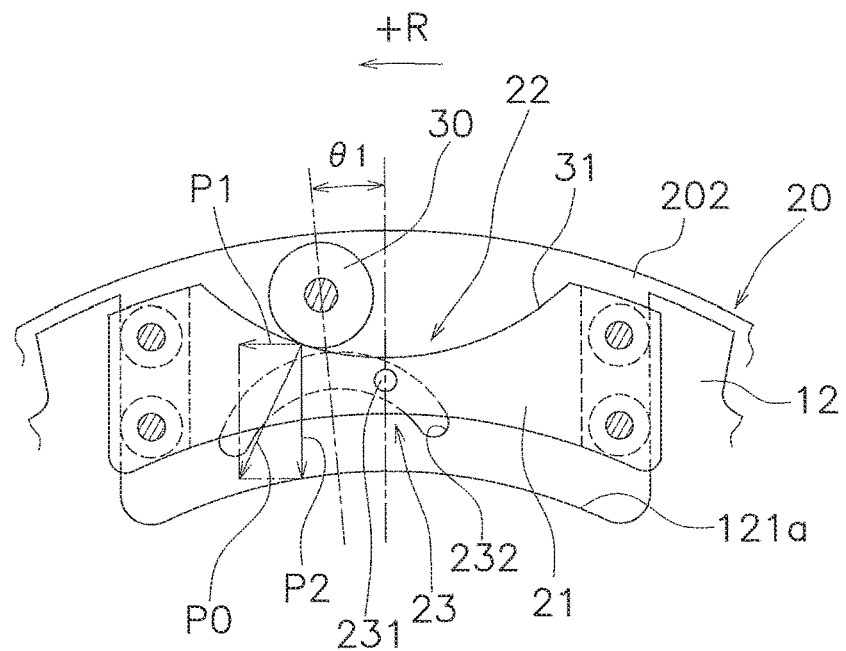
FIG. 5 is a diagram for explaining actuation of each cam mechanism.
Figure 6:
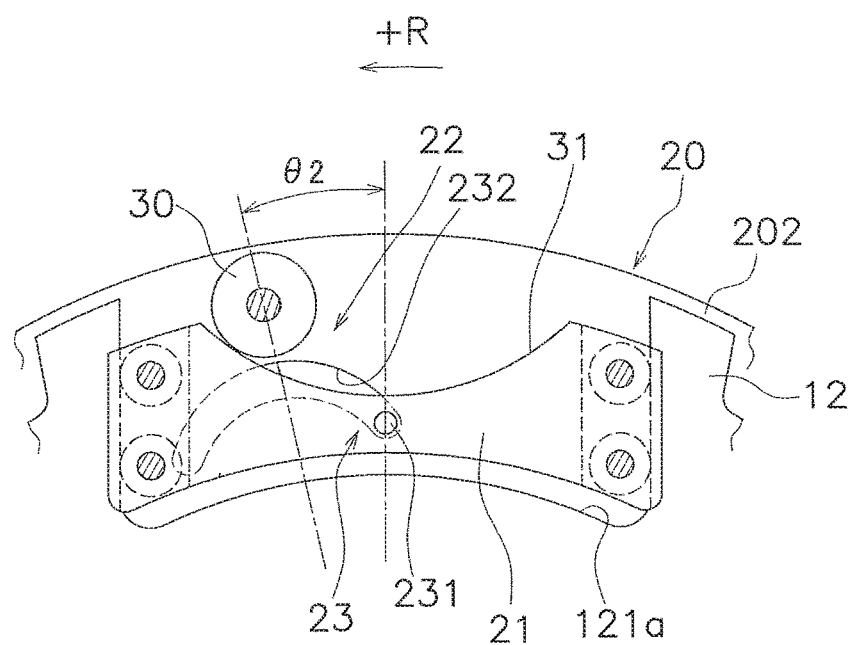
FIG. 6 is a diagram for explaining the actuation of each cam mechanism.

When torque fluctuations herein exist in torque transmission, rotational phase difference θ is produced between the hub flange 12 and the inertia ring 20 as shown in FIGS. 5 and 6. FIG. 5 shows a condition that rotational phase difference +θ1 (e.g., 5 degrees) is produced to a +R side, whereas FIG. 6 shows a condition that rotational phase difference +θ2 (e.g., 10 degrees) is similarly produced to the +R side.

As shown in FIG. 5, when the rotational phase difference +θ1 is produced between the hub flange 12 and the inertia ring 20, the roller 30 in each cam mechanism 22 is relatively moved along the cam 31 to the left side in FIG. 5. At this time, a centrifugal force acts on each centrifugal element 21. Hence, a reaction force to be received by the cam 31 provided on each centrifugal element 21 from the roller 30 has a direction and a magnitude indicated by P0 in FIG. 5. A first force component P1 and a second force component P2 are produced by the reaction force P0. The first force component P1 is directed in the circumferential direction, whereas the second force component P2 is directed to move each centrifugal element 21 to the inner peripheral side.

Additionally, the first force component P1 acts as a force to move the hub flange 12 leftward in FIG. 5 through each cam mechanism 22 and each centrifugal element 21. In other words, a force directed to reduce the rotational phase difference between the hub flange 12 and the inertia ring 20 is supposed to act on the hub flange 12. On the other hand, the second force component P2 moves each centrifugal element 21 to the inner peripheral side against the centrifugal force.

It should be noted that when the rotational phase difference is reversely produced, the roller 30 is relatively moved along the cam 31 to the right side in FIG. 5. However, the aforementioned actuation principle is also true of this case.

As described above, when the rotational phase difference is produced between the hub flange 12 and the inertia ring 20 by torque fluctuations, the hub flange 12 receives a force (first force component P1) directed to reduce the rotational phase difference between the both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

It should be noted that during actuation of each cam mechanism 22 described above, movement of each centrifugal element 21 is not restricted by each restriction mechanism 23. In other words, the pin 231, provided in each centrifugal element 21, is smoothly movable along each pair of grooves 232, whereby radial movement of each centrifugal element 21 is not restricted.

On the other hand, when the hub flange 12 and the inertia ring 20 are stopped rotating and immediately after the hub flange 12 and the inertia ring 20 are started rotating, radial movement of each centrifugal element 21 is restricted by each restriction mechanism 23.

Specifically, when the hub flange 12 and the inertia ring 20 are stopped rotating, centrifugal forces no longer act on the centrifugal elements 21. Therefore, one of the four centrifugal elements 21, which is located in the upper position, drops in an inner peripheral direction (downward). When it is herein assumed that the restriction mechanisms 23 are not provided, the centrifugal element 21 drops downward and collides at the inner peripheral surface thereof with the bottom surface of its corresponding recess 121a, whereby hitting sound is produced.

However, the restriction mechanisms 23 are herein provided. Hence, as shown in FIG. 6, the pin 231, fixed to the centrifugal element 21, makes contact with one-side end surfaces of the pair of grooves 232, whereby the centrifugal element 21 is restricted from moving to the further inner peripheral side (downward) from the position shown in FIG. 6. Therefore, the centrifugal element 21 does not collide at the inner peripheral surface thereof with the bottom surface of its corresponding recess 121a, whereby production of hitting sound can be avoided in stop of rotation.

Incidentally, when it is assumed that the restriction mechanisms 23 are not provided, one of the centrifugal elements 21, located in the upper position in stop of rotation, is supposed to drop downward to the position that this centrifugal element 21 makes contact with the bottom surface of its corresponding recess 121a. In this case, a relatively wide gap exists between the cam 31, which is the outer peripheral surface of the centrifugal element 21, and the roller 30. When the hub flange 12 and the inertia ring 20 are started rotating in this condition, the centrifugal element 21 is moved to the outer peripheral side and collides with the roller 30, whereby hitting sound is produced.

However, the restriction mechanisms 23 are herein provided. Therefore, even when the centrifugal element 21 drops to the innermost peripheral side (downmost) in stop of rotation as shown in FIG. 6, the outer peripheral surface of the centrifugal element 21 and the roller 30 makes contact with each other or only a minute gap is produced therebetween. Therefore, even when rotation is started in this condition and the centrifugal element 21 is moved to the outer peripheral side, no hitting sound is produced or hitting sound can be reduced even when produced.

[Exemplary Characteristics]

Figure 7:
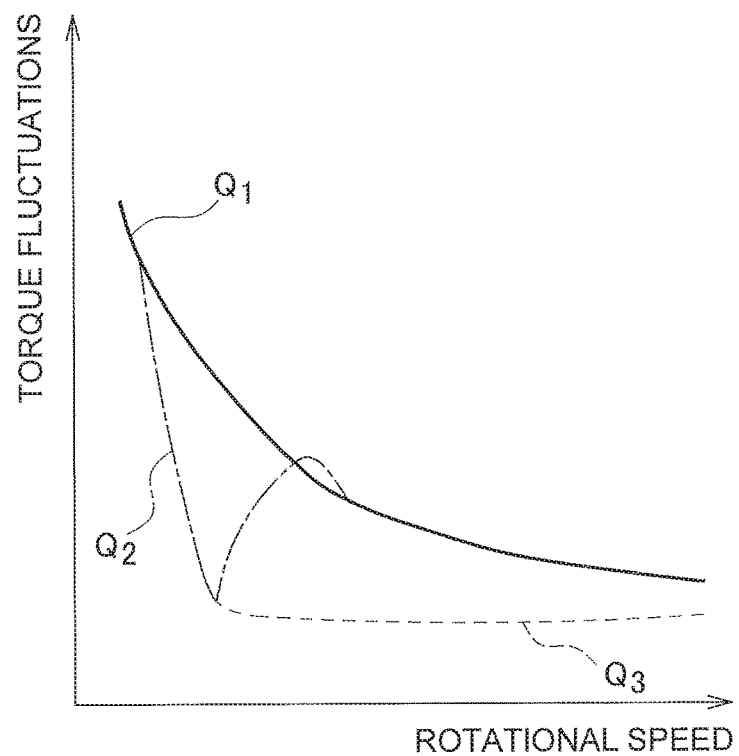
FIG. 7 is a characteristic diagram showing a relation between rotational speed and torque fluctuations.

FIG. 7 is a chart showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 7, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited through the entire rotational speed ranges.

Second Exemplary Embodiment

Figure 8:
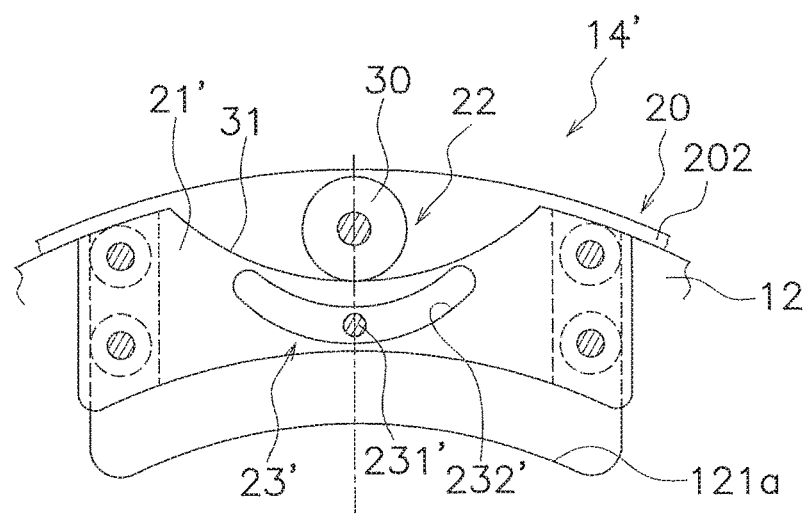
FIG. 8 is a diagram corresponding to FIG. 2 in a second exemplary embodiment of the present invention.
Figure 9:
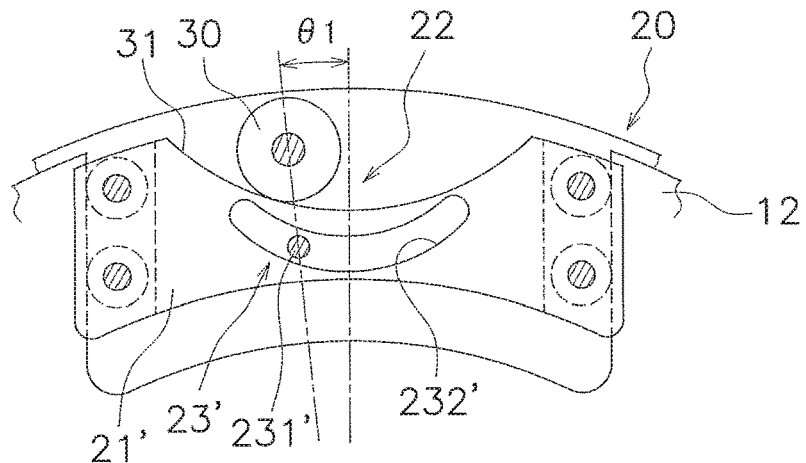
FIG. 9 is a diagram for explaining actuation of each cam mechanism in the second exemplary embodiment.
Figure 10:
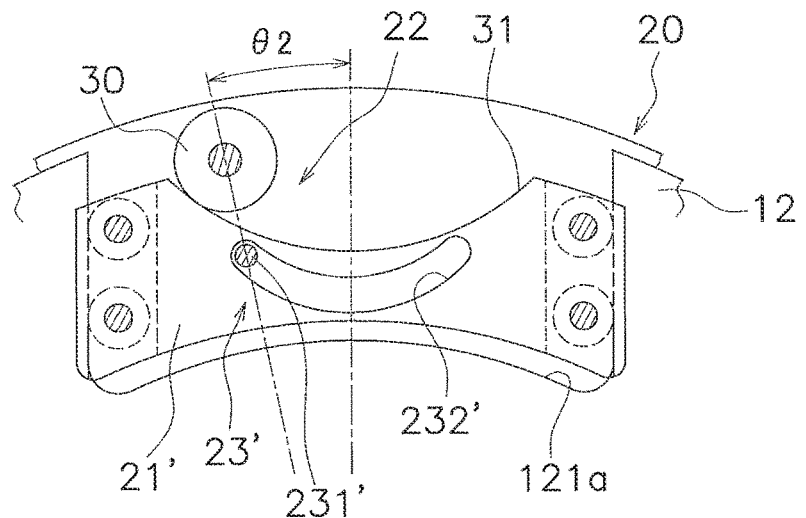
FIG. 10 is a diagram for explaining the actuation of each cam mechanism in the second exemplary embodiment.

FIGS. 8 to 10 show part of a torque fluctuation inhibiting device according to a second exemplary embodiment of the present invention, and correspond to FIGS. 2, 5 and 6 in the first exemplary embodiment. It should be noted that these drawings show a condition that the inertia ring 201, which is one of the inertia rings (near-side one in the respective drawings), is detached.

A torque fluctuation inhibiting device 14' according to the second exemplary embodiment is similar to the torque fluctuation inhibiting device 14 according to the first exemplary embodiment regarding basic configurations such as the actuation of each cam mechanism 22, but is different from the torque fluctuation inhibiting device 14 according to the first exemplary embodiment regarding the configuration of each restriction mechanism.

Similarly to the first exemplary embodiment, restriction mechanisms 23' shown in FIG. 8 allow actuation of centrifugal elements 21' by the cam mechanisms 22, and restrict radial movement of the centrifugal elements 21'. Each restriction mechanism 23' includes a pin 231' (restriction shaft) and a pair of grooves 232' (restriction grooves).

The pin 231' is provided to couple the first inertia ring 201 and the second inertia ring 202. In other words, the pin 231' extends between the both inertia rings 201 and 202 along the rotational axis direction. Additionally, when no rotational phase difference is produced between the hub flange 12 and the inertia ring 20 (in the condition shown in FIG. 8), the pin 231' is provided to be located in the circumferential middle of each recess 121a of the hub flange 12.

The pair of grooves 232' is provided in the circumferential middle part of each centrifugal element 21', and is each made in the shape of a circular arc protruding to the inner peripheral side. The pair of grooves 232' is penetrated by the pin 231'. A predetermined gap is produced between the pin 231' and each of the pair of grooves 232', whereby the pin 231' is smoothly movable within the pair of grooves 232'.

Incidentally, similarly to the first exemplary embodiment, when the hub flange 12 and the first and second inertia rings 201 and 202 are being rotated in synchronization with each other (i.e., when no rotational phase difference is produced between the hub flange 12 and the both inertia rings 201 and 202), the pin 231' is located in the lengthwise (circumferential) middle of the pair of grooves 232' as shown in FIG. 8. When the rotational phase difference is then produced between the hub flange 12 and the both inertia rings 201 and 202, each centrifugal element 21' is radially moved by the actuation of each cam mechanism 22. With this actuation of each centrifugal element 21', the pin 231' is moved along the pair of grooves 232' as shown in FIGS. 9 and 10. However, the shape of the pair of grooves 232' is set to prevent the inner peripheral surface of each centrifugal element 21' from making contact with the bottom surface of each recess 121a of the hub flange 12 regardless of where the pin 231' is located within the pair of grooves 232'.

FIGS. 9 and 10 are diagrams showing states of actuation of each cam mechanism 22, and correspond to FIGS. 5 and 6 in the first exemplary embodiment. The actuation of each cam mechanism 22 and that of each restriction mechanism 23' are similar to those in the first exemplary embodiment. Hence, detailed explanation thereof will be omitted.

Advantageous effects similar to those achieved in the first exemplary embodiment can be achieved as well in the second exemplary embodiment herein described.

Third Exemplary Embodiment

Figure 11:
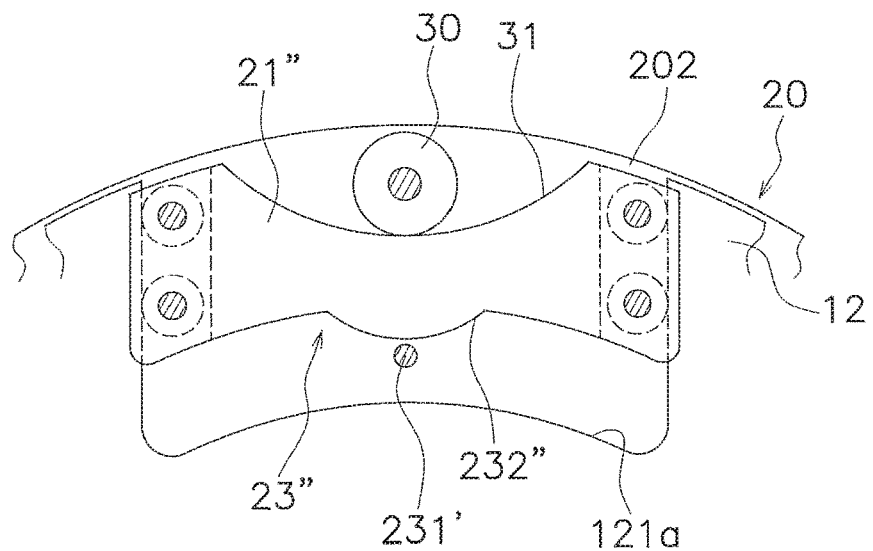
FIG. 11 is a diagram corresponding to FIG. 2 in a third exemplary embodiment of the present invention.

FIG. 11 shows part of a torque fluctuation inhibiting device according to a third exemplary embodiment, and corresponds to FIG. 2 in the first exemplary embodiment and FIG. 8 in the second exemplary embodiment. The third exemplary embodiment is different from the second exemplary embodiment only regarding the configuration of each restriction mechanism. Specifically, each restriction mechanism 23" in the third exemplary embodiment is composed of a pin 231' and a restriction surface 232" provided on the inner peripheral surface of each centrifugal element 21". The pin 231' is similar to that in the second exemplary embodiment. The restriction surface 232" is the inner peripheral surface of each centrifugal element 21", and makes contact with the pin 231'. The restriction surface 232" is made in the shape of a circular arc protruding to the inner peripheral side.

It should be noted that similarly to the aforementioned respective exemplary embodiments, the shape of the restriction surface 232" is set to prevent the inner peripheral surface of each centrifugal element 21" from making contact with the bottom surface of each recess 121a of the hub flange 12 regardless of with which part of the restriction surface 232" the pin 23' makes contact.

Here, in stop of rotation, the restriction surface 232" makes contact with the pin 231', whereby each centrifugal element 21" is restricted from moving to the inner peripheral side. Therefore, the inner peripheral surface of each centrifugal element 21" does not collide with the bottom surface of each recess 121a, whereby production of hitting sound can be avoided in stop of rotation.

Fourth Exemplary Embodiment

Figure 12:
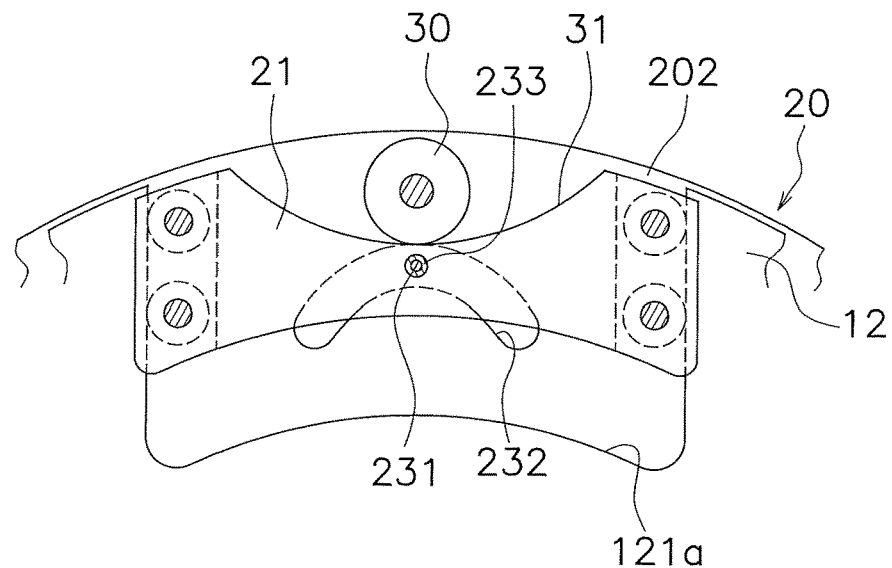
FIG. 12 is a diagram corresponding to FIG. 2 in a fourth exemplary embodiment of the present invention.

FIG. 12 shows part of a torque fluctuation inhibiting device according to a fourth exemplary embodiment, and corresponds to FIG. 2 in the first exemplary embodiment. The fourth exemplary embodiment is different from the first exemplary embodiment only regarding the configuration of each restriction mechanism. Specifically, in the fourth exemplary embodiment, an elastic body 233 is provided on the outer peripheral surface of each pin 231.

In this case, the elastic body 233 is provided between each pin 231 and each of the pair of restriction grooves 232. Hence, when each pin 231 and the pair of restriction grooves 232 collide against each other, shock is alleviated and hitting sound in collision can be further reduced.

It should be noted that the elastic body 233 may be provided not on the outer peripheral surface of each pin 231 but on the inner peripheral surface of each of the pair of restriction grooves 232, i.e., a surface with which each pin 231 makes contact.

Fifth Exemplary Embodiment

Figure 13:
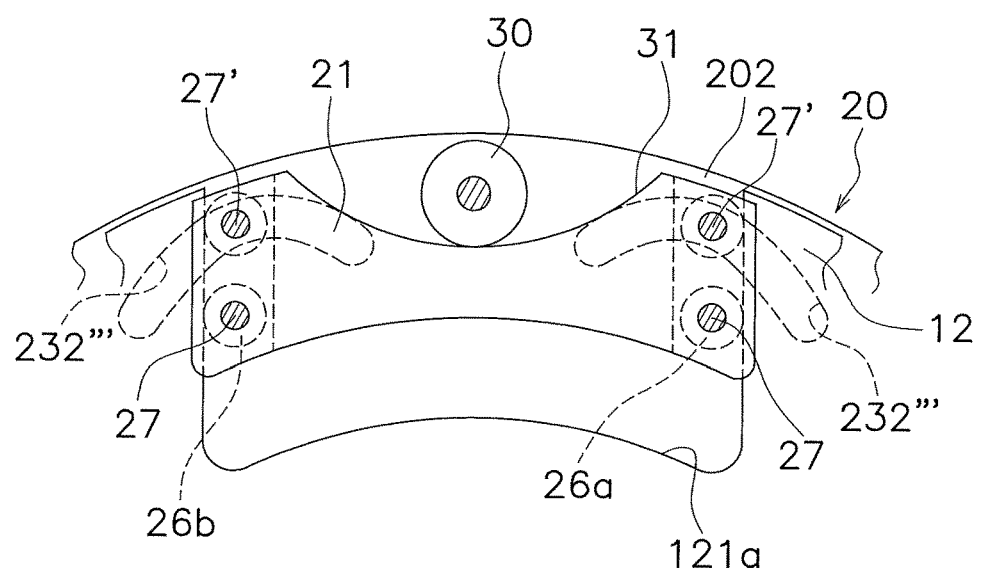
FIG. 13 is a diagram corresponding to FIG. 2 in a fifth exemplary embodiment of the present invention.

FIG. 13 shows part of a torque fluctuation inhibiting device according to a fifth exemplary embodiment, and corresponds to FIG. 2 in the first exemplary embodiment. The fifth exemplary embodiment is different from the first exemplary embodiment only regarding the configuration of each restriction mechanism. Specifically in the fifth exemplary embodiment, each restriction mechanism 23" ' includes pins 27' (restriction shafts), supporting the rollers 26a and 26b, and pairs of grooves 232''' (restriction grooves) provided in the first and second inertia rings 201 and 202.

Each pin 27' is provided to penetrate each centrifugal element 21 and each pair of grooves 232''' of the first and second inertia rings 201 and 202 in the rotational axis direction. Each pair of grooves 232''', having the same shape, is provided in corresponding positions on the first inertia ring 201 and the second inertia ring 202. Each pair of grooves 232''', into which each pin 27' is inserted, is each made in the shape of a circular arc protruding to the outer peripheral side. A predetermined gap is produced between each pin 27' and each of each pair of grooves 232''', whereby each pin 27' is smoothly movable within each pair of grooves 232'''.

Other Exemplary Embodiments

The present invention is not limited to the exemplary embodiments described above, and a variety of changes or modifications can be made without departing from the scope of the present invention.

(a) In the aforementioned exemplary embodiments, each inertia ring is composed of a continuous annular member, but alternatively, may be composed of a plurality of divided inertia bodies disposed in circumferential alignment. In this case, it is required to provide a holding member such as an annular holding ring on the outer peripheral side of the plural inertia bodies so as to hold the plural inertia bodies.

(b) In the aforementioned exemplary embodiments, the rollers are disposed as guide parts. However, other members for reducing friction, such as resin races, sheets or so forth may be disposed instead.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 14:
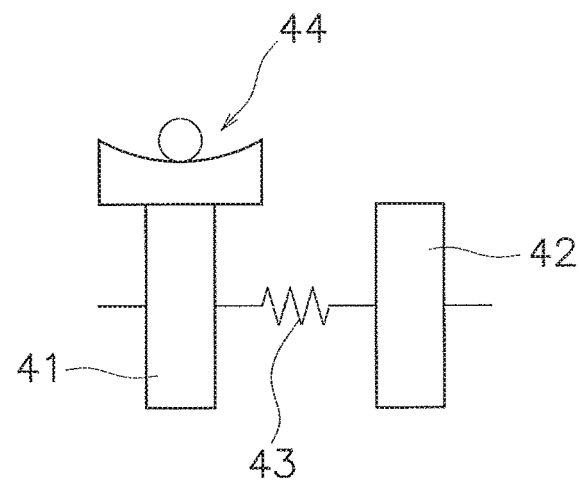
FIG. 14 is a schematic diagram showing application example 1 of the present invention.

(1) FIG. 14 is a diagram schematically showing a torque converter. The torque converter includes an input-side rotor 41, a hub flange 42 and a damper 43 disposed between the input-side rotor 41 and the hub flange 42. The input-side rotor 41 includes members such as a front cover, a drive plate and a piston. The hub flange 42 includes a driven plate and a turbine hub. The damper 43 includes a plurality of torsion springs.

In the example shown in FIG. 14, a centrifugal element is provided on any of the rotary members composing the input-side rotor 41, and a cam mechanism and a restriction mechanism are collectively provided as a cam-mechanism and restriction-mechanism unit 44 actuated with use of a centrifugal force acting on the centrifugal element. A configuration applicable to the cam-mechanism and restriction-mechanism unit 44 is similar to that in the aforementioned respective exemplary embodiments.

Figure 15:
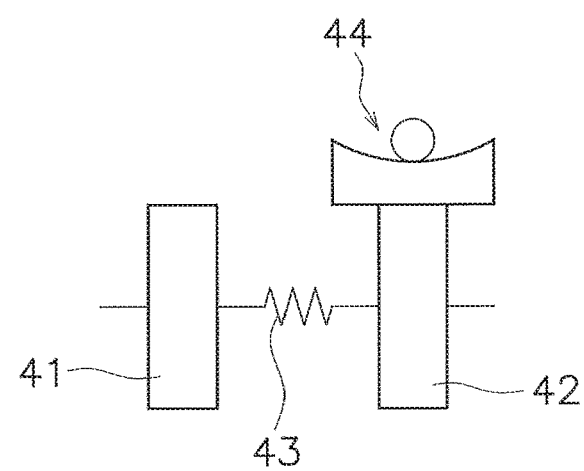
FIG. 15 is a schematic diagram showing application example 2 of the present invention.

(2) In a torque converter shown in FIG. 15, a centrifugal element is provided on any of the rotary members composing the hub flange 42, and the cam-mechanism and restriction-mechanism unit 44 is provided to be actuated with use of a centrifugal force acting on the centrifugal element. A configuration applicable to the cam-mechanism and restriction-mechanism unit 44 is similar to that in the aforementioned respective exemplary embodiments.

Figure 16:
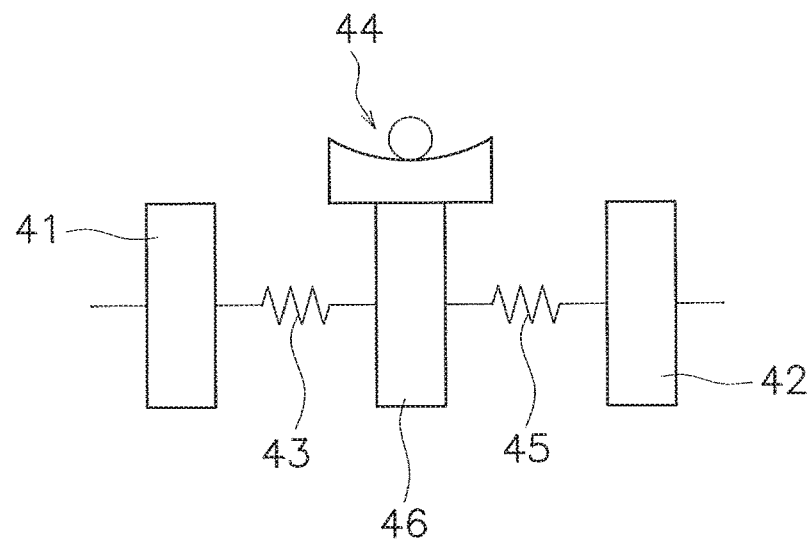
FIG. 16 is a schematic diagram showing application example 3 of the present invention.

(3) A torque converter shown in FIG. 16 includes another damper 45 and an intermediate member 46 provided between the two dampers 43 and 45 in addition to the configurations shown in FIGS. 14 and 15. The intermediate member 46 is rotatable relatively to the input-side rotor 41 and the hub flange 42, and makes the two dampers 43 and 45 act in series.

In the example shown in FIG. 16, a centrifugal element is provided on the intermediate member 46, and the cam-mechanism and restriction-mechanism unit 44 is provided to be actuated with use of a centrifugal force acting on the centrifugal element. A configuration applicable to the cam-mechanism and restriction-mechanism unit 44 is similar to that in the aforementioned respective exemplary embodiments.

Figure 17:
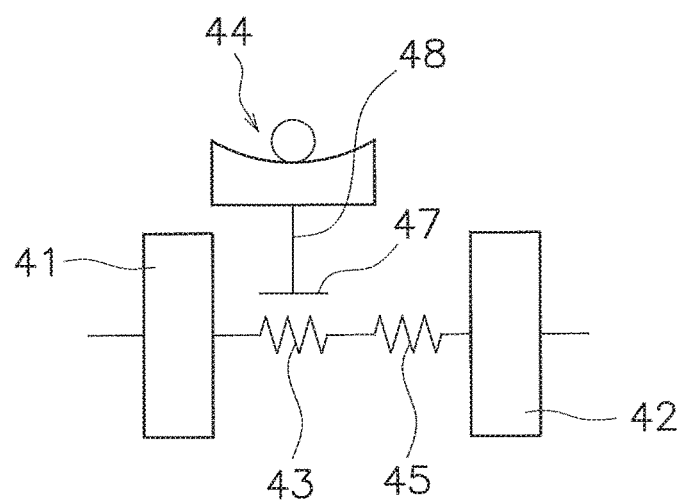
FIG. 17 is a schematic diagram showing application example 4 of the present invention.

(4) A torque converter shown in FIG. 17 includes a float member 47. The float member 47 is a member for supporting the torsion springs composing the damper 43. For example, the float member 47 has an annular shape and is disposed to cover the torsion springs from the outer peripheral side and at least one lateral side. Additionally, the float member 47 is rotatable relatively to the input-side rotor 41 and the hub flange 42, and is rotated together with the damper 43 by friction with the torsion springs of the damper 43. In other words, the float member 47 is also rotated.

In the example shown in FIG. 17, a centrifugal element 48 is provided on the float member 47, and the cam-mechanism and restriction-mechanism unit 44 is provided to be actuated with use of a centrifugal force acting on the centrifugal element 48. A configuration applicable to the cam-mechanism and restriction-mechanism unit 44 is similar to that in the aforementioned respective exemplary embodiments.

Figure 18:
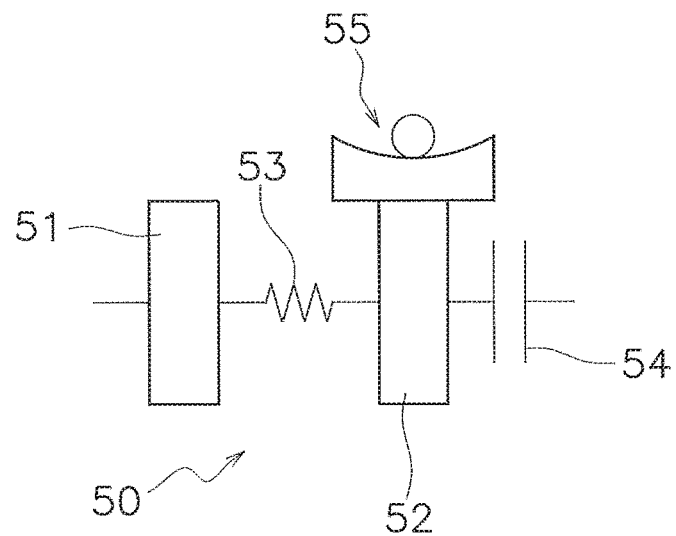
FIG. 18 is a schematic diagram showing application example 5 of the present invention.

(5) FIG. 18 is a schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relatively to the first inertia body 51. The damper 53 is disposed between the two inertia bodies 51 and 52. It should be noted that the second inertia body 52 is composed of rotary members including a clutch cover composing the clutch device 54.

In the example shown in FIG. 18, any of the rotary members composing the second inertia body 52 is provided with a centrifugal element, and a cam mechanism and a restriction mechanism are collectively provided as a cam-mechanism and restriction-mechanism unit 55 actuated with use of a centrifugal force acting on the centrifugal element. A configuration applicable to the cam-mechanism and restriction-mechanism unit 55 is similar to that in the aforementioned respective exemplary embodiments.

Figure 19:
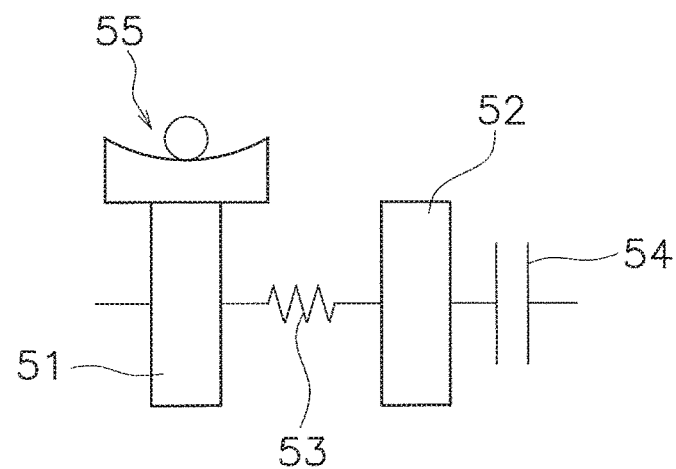
FIG. 19 is a schematic diagram showing application example 6 of the present invention.

(6) FIG. 19 shows an example of a power transmission device similar to that in FIG. 18. In this example, a centrifugal element is provided on the first inertia body 51. Additionally, the cam-mechanism and restriction-mechanism unit 55 is provided to be actuated with use of a centrifugal force acting on the centrifugal element. A configuration applicable to the cam-mechanism and restriction-mechanism unit 55 is similar to that in the aforementioned respective exemplary embodiments.

Figure 20:
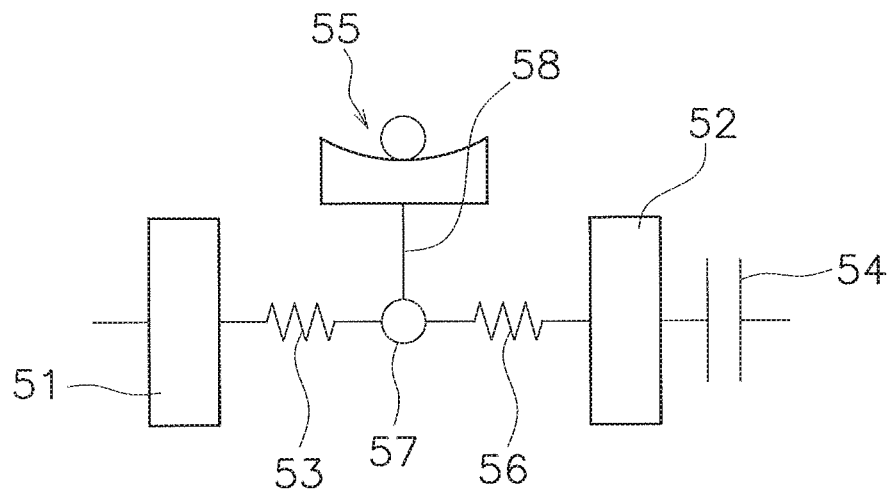
FIG. 20 is a schematic diagram showing application example 7 of the present invention.

(7) A power transmission device shown in FIG. 20 includes another damper 56 and an intermediate member 57 provided between the two dampers 53 and 56 in addition to the configurations shown in FIGS. 18 and 19. The intermediate member 57 is rotatable relatively to the first and second inertia bodies 51 and 52.

In the example shown in FIG. 20, a centrifugal element 58 is provided on the intermediate member 57, and the cam-mechanism and restriction-mechanism unit 55 is provided to be actuated with use of a centrifugal force acting on the centrifugal element 58. A configuration applicable to the cam-mechanism and restriction-mechanism unit 55 is similar to that in the aforementioned respective exemplary embodiments.

Figure 21:
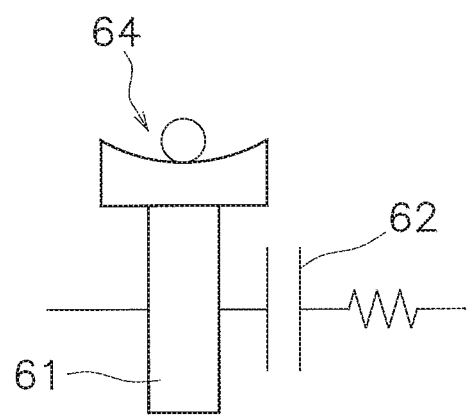
FIG. 21 is a schematic diagram showing application example 8 of the present invention.

(8) FIG. 21 is a schematic diagram of a power transmission device that a clutch device is provided on one flywheel. In FIG. 21, a first inertia body 61 includes one flywheel and a clutch cover of a clutch device 62. In this example, a centrifugal element is provided on any of the rotary members composing the first inertia body 61, and a cam mechanism and a restriction mechanism are collectively provided as a cam-mechanism and restriction-mechanism unit 64 actuated with use of a centrifugal force acting on the centrifugal element. A configuration applicable to the cam-mechanism and restriction-mechanism unit 64 is similar to that in the aforementioned respective exemplary embodiments.

Figure 22:
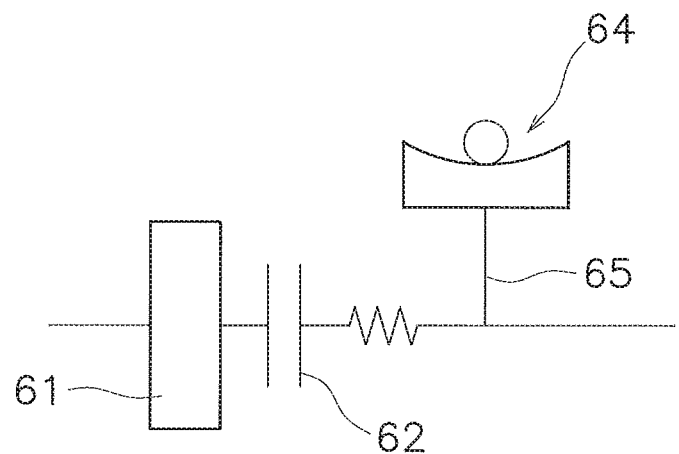
FIG. 22 is a schematic diagram showing application example 9 of the present invention.

(9) FIG. 22 shows an example of a power transmission device similar to that in FIG. 21. In this example, a centrifugal element 65 is provided on an output side of the clutch device 62. Additionally, the cam-mechanism and restriction-mechanism unit 64 is provided to be actuated with use of a centrifugal force acting on the centrifugal element 65. A configuration applicable to the cam-mechanism and restriction-mechanism unit 64 is similar to that in the aforementioned respective exemplary embodiments.

(10) The torque fluctuation inhibiting device of the present invention may be disposed on any of the rotary members composing the transmission, and furthermore, may be disposed on an output-side shaft (a propeller shaft or a drive shaft) of the transmission, although these configurations are not shown in the drawings.

(11) As another application example, the torque fluctuation inhibiting device of the present invention may be further applied to a heretofore well-known dynamic damper device or a power transmission device provided with a pendulum-type damper device.

INDUSTRIAL APPLICABILITY

According to the present invention, in a device for inhibiting torque fluctuations in a rotary member, a peak of torque fluctuations can be reduced in a relatively wide rotational speed range. According to the present invention, it is also possible to inhibit hitting sound from being produced in collision of a centrifugal element against another member.

REFERENCE SIGNS LIST

1 Torque converter
11 Input-side rotor
12 Hub flange (rotor)
121a Recess
14, 14' Torque fluctuation inhibiting device
20, 201, 202 Inertia ring (mass body)
21, 21', 21" Centrifugal element
22 Cam mechanism
23, 23', 23", 23'" Restriction mechanism
231, 231' Pin (restriction shaft)
232, 232', 232'" Groove (restriction groove)
232" Restriction surface
30 Roller (cam follower)
31 Cam

The invention claimed is:

1. A torque fluctuation inhibiting device inhibiting torque fluctuations in a rotor to which a torque is inputted, the torque fluctuation inhibiting device comprising:
a mass body disposed to be rotatable with the rotor in a state in which the torque inputted to the rotor does not fluctuate and be rotatable relative to the rotor in a state in which the torque inputted to the rotor fluctuates;
a plurality of centrifugal elements, each of the plurality of centrifugal elements disposed to receive a centrifugal force generated in rotation of the rotor and the mass body;
a plurality of cam mechanisms, each of the plurality of cam mechanisms configured to convert the centrifugal force into a circumferential force when a relative displacement is produced between the rotor and the mass body in a rotational direction while the centrifugal force is acting on the each of the plurality of centrifugal elements, the circumferential force directed to reduce the relative displacement; and
a plurality of restriction mechanisms, each of the plurality of restriction mechanisms configured to allow actuation of the each of the plurality of centrifugal elements by the each of the plurality of cam mechanisms, the each of the plurality of restriction mechanisms configured to restrict radial movement of the each of the plurality of centrifugal elements,
the rotor including a plurality of recesses on an outer peripheral surface thereof,
the each of the plurality of centrifugal elements being accommodated in each of the plurality of recesses of the rotor, and
the each of the plurality of restriction mechanisms being further configured to restrict an inner peripheral surface of the each of the plurality of centrifugal elements from contacting a bottom surface of the each of the plurality of recesses, the bottom surface of the each of the plurality of recesses located radially inside the inner peripheral surface of the each of the plurality of centrifugal elements.

2. The torque fluctuation inhibiting device according to claim 1, wherein the each of the plurality of restriction mechanisms includes
a restriction shaft extending parallel to a rotational axis of the rotor, the restriction shaft provided in one of the mass body and the each of the plurality of centrifugal elements, and
a restriction groove into which the restriction shaft is inserted, the restriction groove provided in the other of the mass body and the each of the plurality of centrifugal elements.

3. The torque fluctuation inhibiting device according to claim 2, further comprising:
an elastic body provided on either an outer peripheral surface of the restriction shaft or a surface with which the restriction shaft makes contact.

4. The torque fluctuation inhibiting device according to claim 1, wherein the each of the plurality of restriction mechanisms includes
a restriction shaft extending parallel to a rotational axis of the rotor, the restriction shaft provided in the mass body, and
a restriction surface against which the restriction shaft slides, the restriction surface provided on an inner peripheral surface of the each of the plurality of centrifugal elements.

5. The torque fluctuation inhibiting device according to claim 1, wherein the each of the plurality of cam mechanisms includes
a cam provided on one of the mass body and the each of the plurality of centrifugal elements, and
a cam follower provided on the other of the mass body and the each of the plurality of centrifugal elements, the cam follower being moved along the cam.

6. The torque fluctuation inhibiting device according to claim 5, wherein
the mass body includes a first inertia ring, a second inertia ring and a pin, the first and second inertia rings being disposed in opposition to each other through the rotor, the pin coupling the first and second inertia rings to each other so as to make the first and second inertia rings non-rotatable relatively to each other,
the each of the plurality of centrifugal elements is disposed on an outer peripheral part of the rotor and on an inner peripheral side of the pin while being disposed between the first inertia ring and the second inertia ring in an axial direction,
the cam follower is a cylindrical roller, the cylindrical roller including a hole that an interior thereof is penetrated by the pin in the axial direction, and
the cam is provided on the each of the plurality of centrifugal elements so as to make contact with the cam follower, the cam having a shape making the circumferential force vary in accordance with an amount of the relative displacement between the rotor and the mass body in the rotational direction.

7. A torque converter disposed between an engine and a transmission, the torque converter comprising:
an input-side rotor to which a torque is inputted from the engine; an output-side rotor outputting the torque to the transmission;
a damper disposed between the input-side rotor and the output-side rotor; and the torque fluctuation inhibiting device recited in claim 1.

8. A power transmission device comprising:
a flywheel including a first inertia body, a second inertia body and a damper, the first inertia body being rotated about a rotational axis, the second inertia body being rotated about the rotational axis, the second inertia body being rotatable relatively to the first inertia body, the damper being disposed between the first inertia body and the second inertia body;
a clutch device provided on the second inertia body of the flywheel; and
the torque fluctuation inhibiting device recited in claim 1.

* * * * *